United States Patent
Citrano, III et al.

(10) Patent No.: US 9,485,649 B2
(45) Date of Patent: Nov. 1, 2016

(54) WIRELESS MESH NETWORK WITH PINCH POINT AND LOW BATTERY ALERTS

(75) Inventors: Joseph Citrano, III, Eden Prairie, MN (US); Daniel Clifford Carlson, Chanhassen, MN (US); Iain Peter Sharp, Stockton-on-Tees (GB); Mark Richard Ivison, Redcar (GB); Peter Hodgson, Stockton-on-Tees (GB); Kevin Andrew Shaw, Stockton-on-Tees (GB)

(73) Assignee: Fisher-Rosemount Systems, Inc., Austin, TX (US)

( * ) Notice: Subject to any disclaimer, the term of this patent is extended or adjusted under 35 U.S.C. 154(b) by 445 days.

(21) Appl. No.: 12/735,074

(22) PCT Filed: Sep. 25, 2009

(86) PCT No.: PCT/US2009/058366
§ 371 (c)(1),
(2), (4) Date: Jun. 14, 2010

(87) PCT Pub. No.: WO2010/036885
PCT Pub. Date: Apr. 1, 2010

(65) Prior Publication Data
US 2011/0164512 A1    Jul. 7, 2011

Related U.S. Application Data

(60) Provisional application No. 61/099,959, filed on Sep. 25, 2008.

(51) Int. Cl.
*H04W 8/22* (2009.01)
*H04W 84/00* (2009.01)
(Continued)

(52) U.S. Cl.
CPC .......... *H04W 8/22* (2013.01); *H04W 52/0225* (2013.01); *H04W 84/18* (2013.01); *Y02B 60/50* (2013.01)

(58) Field of Classification Search
CPC . H04W 8/22; H04W 52/0225; H04W 84/18; Y02B 60/50
USPC ....... 370/241, 252, 254, 255, 310, 311, 345, 370/431, 442, 458, 464, 498, 522
See application file for complete search history.

(56) References Cited

U.S. PATENT DOCUMENTS 5,502,639 A    3/1996    Fukunaga et al.
5,560,021 A    9/1996    Vook et al.
(Continued)

FOREIGN PATENT DOCUMENTS

JP    2000115171 A    4/2000
JP    2006211375 A    8/2006
(Continued)

OTHER PUBLICATIONS

Acromag Incorporated, "Introduction to PROFIBUS DP," ProfiBus/RS485 Network I/O Modules, Technical Reference. 2002.
(Continued)

*Primary Examiner* — Omar Ghowrwal
(74) *Attorney, Agent, or Firm* — Kinney & Lange, P.A.

(57) ABSTRACT

A wireless mesh network includes a plurality of wireless devices and a gateway organized in a multi hop mesh topology. Each wireless device maintains and reports radio statistics to the gateway, and also reports battery conditions of its power source. The device manager communicates with the gateway and provides an alert indicating existence of a pinch point within the mesh network based upon the radio statistics. When a low battery condition is reported by a device, the device manager determines whether loss of that device is a pinch point or will cause a pinch point, and provides a low battery alert prioritized based upon the pinch point analysis.

16 Claims, 2 Drawing Sheets

(51) Int. Cl.
*H04W 52/02* (2009.01)
*H04W 84/18* (2009.01)

(56) References Cited

U.S. PATENT DOCUMENTS

| | | | |
|---|---|---|---|
| 5,862,391 A | 1/1999 | Salas et al. |
| 6,185,208 B1 | 2/2001 | Liao |
| 6,301,527 B1 | 10/2001 | Butland et al. |
| 6,363,062 B1 | 3/2002 | Aaronson et al. |
| 6,374,311 B1 | 4/2002 | Mahany et al. |
| 6,711,166 B1 | 3/2004 | Amir et al. |
| 6,731,946 B1 | 5/2004 | Stanwood et al. |
| 6,741,554 B2 | 5/2004 | D'Amico et al. |
| 6,775,276 B1 | 8/2004 | Beser |
| 6,826,607 B1 | 11/2004 | Gelvin et al. |
| 6,832,251 B1 | 12/2004 | Gelvin et al. |
| 6,859,831 B1 | 2/2005 | Gelvin et al. |
| 6,891,838 B1 | 5/2005 | Petite et al. |
| 6,971,063 B1 | 11/2005 | Rappaport et al. |
| 6,990,189 B2 | 1/2006 | Ljubicich |
| 7,010,294 B1 | 3/2006 | Pyotsia et al. |
| 7,035,773 B2 | 4/2006 | Keyes et al. |
| 7,042,352 B2 | 5/2006 | Kates |
| 7,053,770 B2 | 5/2006 | Ratiu et al. |
| 7,075,890 B2 | 7/2006 | Ozer et al. |
| 7,075,892 B2 | 7/2006 | Grover et al. |
| 7,114,388 B1 | 10/2006 | French et al. |
| 7,130,915 B1 | 10/2006 | Rustad |
| 7,139,239 B2 | 11/2006 | McFarland |
| 7,155,228 B2 | 12/2006 | Rappaport et al. |
| 7,187,277 B2 | 3/2007 | Kobayashi |
| 7,233,745 B2 | 6/2007 | Loechner |
| 7,246,045 B1 | 7/2007 | Rappaport et al. |
| 7,262,693 B2 | 8/2007 | Karschnia et al. |
| 7,277,401 B2 | 10/2007 | Kyperountas et al. |
| 7,327,998 B2 | 2/2008 | Kumar et al. |
| 7,339,489 B2 | 3/2008 | Arita et al. |
| 7,388,886 B2 | 6/2008 | Perkins et al. |
| 7,406,060 B2 | 7/2008 | Periyalwar et al. |
| 7,408,911 B2 | 8/2008 | Joshi |
| 7,424,698 B2 | 9/2008 | Honary et al. |
| 7,436,790 B2 | 10/2008 | Todd et al. |
| 7,437,596 B2 | 10/2008 | McFarland |
| 7,440,436 B2 | 10/2008 | Cheng et al. |
| 7,460,865 B2 | 12/2008 | Nixon et al. |
| 7,468,969 B2 | 12/2008 | Zuniga |
| 7,489,282 B2 | 2/2009 | Lastinger et al. |
| 7,505,734 B2 | 3/2009 | Ratiu et al. |
| 7,515,608 B2 | 4/2009 | Yuan et al. |
| 7,536,167 B2 | 5/2009 | Gollnick et al. |
| 7,554,941 B2 | 6/2009 | Ratiu et al. |
| 7,558,622 B2 | 7/2009 | Tran |
| 7,562,393 B2 | 7/2009 | Buddhikot et al. |
| 7,564,842 B2 | 7/2009 | Callaway, Jr. et al. |
| 7,581,053 B2 | 8/2009 | Sichner et al. |
| 7,610,049 B2 | 10/2009 | Watanabe |
| 7,620,409 B2 | 11/2009 | Budampati et al. |
| 7,639,158 B2 | 12/2009 | Kobayashi |
| 7,640,007 B2 | 12/2009 | Chen et al. |
| 7,680,460 B2 | 3/2010 | Nelson et al. |
| 7,697,893 B2 | 4/2010 | Kossi et al. |
| 7,701,858 B2 | 4/2010 | Werb et al. |
| 7,705,729 B2 | 4/2010 | Broad et al. |
| 2002/0167954 A1 | 11/2002 | Highsmith et al. |
| 2002/0178273 A1 | 11/2002 | Pardo-Castellote et al. |
| 2003/0151513 A1 | 8/2003 | Herrmann et al. |
| 2004/0001084 A1 | 1/2004 | Shrinidhi et al. |
| 2004/0259554 A1 | 12/2004 | Rappaport et al. |
| 2004/0259555 A1 | 12/2004 | Rappaport et al. |
| 2005/0036487 A1 | 2/2005 | Srikrishna |
| 2005/0074019 A1 | 4/2005 | Handforth et al. |
| 2005/0147119 A1 | 7/2005 | Tofano |
| 2005/0149940 A1 | 7/2005 | Calinescu et al. |
| 2005/0192037 A1 | 9/2005 | Nanda et al. |
| 2005/0192727 A1 | 9/2005 | Shostak et al. |
| 2005/0201349 A1 | 9/2005 | Budampati |
| 2005/0213612 A1 | 9/2005 | Pister et al. |
| 2005/0223110 A1 | 10/2005 | Honary et al. |
| 2005/0238058 A1 | 10/2005 | Pierce, Jr. et al. |
| 2006/0002368 A1 | 1/2006 | Budampati et al. |
| 2006/0028997 A1 | 2/2006 | McFarland |
| 2006/0029060 A1 | 2/2006 | Pister |
| 2006/0029061 A1 | 2/2006 | Pister et al. |
| 2006/0039298 A1 | 2/2006 | Zuniga et al. |
| 2006/0064477 A1 | 3/2006 | Renkis |
| 2006/0095539 A1 | 5/2006 | Renkis |
| 2006/0111040 A1 | 5/2006 | Jenkins et al. |
| 2006/0159024 A1 | 7/2006 | Hester |
| 2006/0193262 A1 | 8/2006 | McSheffrey et al. |
| 2006/0215582 A1 | 9/2006 | Castagnoli et al. |
| 2006/0215627 A1 | 9/2006 | Waxman |
| 2006/0219861 A1 | 10/2006 | Wood |
| 2006/0221949 A1 | 10/2006 | Anjum |
| 2006/0227729 A1 | 10/2006 | Budampati et al. |
| 2006/0256722 A1 | 11/2006 | Taha et al. |
| 2006/0274644 A1 | 12/2006 | Budampati et al. |
| 2006/0274671 A1 | 12/2006 | Budampati et al. |
| 2006/0287001 A1 | 12/2006 | Budampati et al. |
| 2007/0030816 A1 | 2/2007 | Kolavennu |
| 2007/0030832 A1 | 2/2007 | Gonia et al. |
| 2007/0053295 A1 | 3/2007 | Cleveland et al. |
| 2007/0071006 A1 | 3/2007 | Bosch et al. |
| 2007/0147255 A1 | 6/2007 | Oyman |
| 2007/0160020 A1 | 7/2007 | Osann |
| 2007/0183439 A1 | 8/2007 | Osann, Jr. |
| 2007/0184852 A1 | 8/2007 | Johnson et al. |
| 2007/0206503 A1 | 9/2007 | Gong et al. |
| 2007/0206547 A1 | 9/2007 | Gong et al. |
| 2007/0206616 A1 | 9/2007 | Orth |
| 2007/0223310 A1 | 9/2007 | Tran |
| 2007/0230403 A1 | 10/2007 | Douglas et al. |
| 2007/0248047 A1 | 10/2007 | Shorty et al. |
| 2007/0257791 A1 | 11/2007 | Arita et al. |
| 2007/0274228 A1 | 11/2007 | Nandagopalan |
| 2007/0297366 A1 | 12/2007 | Osann |
| 2008/0081676 A1 | 4/2008 | Chakraborty et al. |
| 2008/0125177 A1 | 5/2008 | Gupta |
| 2008/0273486 A1 | 11/2008 | Pratt, Jr. et al. |
| 2008/0274766 A1 | 11/2008 | Pratt, Jr. et al. |
| 2008/0278145 A1 | 11/2008 | Wenger |
| 2008/0279155 A1 | 11/2008 | Pratt, Jr. et al. |
| 2008/0279204 A1 | 11/2008 | Pratt, Jr. et al. |
| 2008/0298275 A1 | 12/2008 | De Sousa |
| 2009/0010190 A1* | 1/2009 | Gong .............. 370/311 |
| 2009/0010203 A1 | 1/2009 | Pratt, Jr. et al. |
| 2009/0010204 A1 | 1/2009 | Pratt, Jr. et al. |
| 2009/0010205 A1 | 1/2009 | Pratt, Jr. et al. |
| 2009/0010233 A1 | 1/2009 | Pratt, Jr. et al. |
| 2009/0117949 A1* | 5/2009 | Allen et al. .............. 455/572 |
| 2009/0222541 A1 | 9/2009 | Monga et al. |
| 2010/0060238 A1* | 3/2010 | Chen et al. .............. 320/136 |
| 2013/0021959 A1* | 1/2013 | Bennet .............. 370/311 |

FOREIGN PATENT DOCUMENTS

| | | |
|---|---|---|
| KR | 10-2007-0084020 A | 8/2007 |
| WO | WO03023536 | 3/2003 |
| WO | 2006021791 A1 | 3/2006 |

OTHER PUBLICATIONS

International Search Report of the Korean Intellectual Property Office in counterpart foreign application No. PCT/US2009/058366 filed Sep. 25, 2009.

Takashi Saito, Method of Fault Location Based on Importance for Remote Maintenance of Sensor Network, Proceedings of the 2008 IEICE General Conference, Mar. 5, 2008, p. 573, Japan.

Office Action of the Japan Patent Office in counterpart foreign application No. JP2011-529254 filed Mar. 24, 2011.

Office Action of the State Intellectual Property Office of the People's Republic of China in counterpart foreign application No. 200980137945.5 filed Mar. 25, 2011.

(56) References Cited

OTHER PUBLICATIONS

Research on Centralized Routing and Scheduling Algorithms in IEEE 802.16 Mesh Networks, masters thesis, Jun. 17, 2008.
Research on Routing Algorithms in Wireless Mesh Networks Based on Load Balance, masters thesis, Sep. 17, 2008.
Bo Han et al., "Performance Evaluation of Scheduling in IEEE 802.16 Based Wireless Mesh Networks", Mobile Adhoc and Sensor Systems (MASS), 2006 IEEE International Conference On, IEEE, PI, Oct. 1, 2006, pp. 789-794.
Extended European Search Report, dated Nov. 21, 2013.

* cited by examiner

WIRELESS MESH NETWORK WITH PINCH POINT AND LOW BATTERY ALERTS

CROSS-REFERENCE TO RELATED APPLICATION(S)

This application claims priority to U.S. Provisional Patent Application No. 61/099,959, filed Sep. 25, 2008 which is hereby incorporated by reference in its entirety.

BACKGROUND

A wireless mesh network is a communication network made up of a plurality of wireless devices (i.e., nodes) organized in a mesh topology. In a true wireless mesh network, which may also be referred to as a self-organizing multi-hop network, each device must be capable of routing messages for itself as well as other devices in the network. The concept of messages hopping from node to node through the network is beneficial because lower power RF radios can be used, and yet the mesh network can span a significant physical area delivering messages from one end to the other. High power radios are not needed in a mesh network, in contrast with point-to-point systems which employ remote devices communicating directly to a centralized base-station.

The term 'self-organizing' refers to the capability of mesh networks to form alternate paths for messaging between devices and between devices and a data collector, or a bridge or gateway to some higher-level, higher-speed data bus. Having alternate, redundant paths for wireless messages enhances data reliability by ensuring there is at least one alternate path for messages to flow even if another path gets blocked or degrades due to environmental influences or due to interference.

The paths provided from each node to a bridge or gateway are dynamic, meaning the paths can change in response to a path being blocked or a new path being added. For example, when a device node is commissioned it will generate a list of devices (i.e., neighbors) with which it can communicate. This list may be particularly dynamic as the radio frequency (RF) environment and physical space occupied by the network change (e.g., a wall or metal shield is constructed between two devices limiting communication between the devices). Based on the dynamic neighbor list, the network manager associated with the gateway selects parent/child devices which define the communication paths to/from the device to the gateway device. The list of parent/child devices is also dynamic, but typically less dynamic than the neighbor list. Because of these dynamics, the organization of the wireless mesh network is continuously changing.

One method of analyzing the operation of a mesh network is to review the organization of the mesh network based on the neighbor lists, parent-child lists, etc. provided by the network. Changes in the organization of the network are used to diagnose problems associated with the network. Prior art methods of analyzing the list include displaying each node in a diagram with lines connecting neighbors and/or parent-child pairs.

If a wireless device (or devices) is reliant on a single wireless device (or limited number of wireless devices) to route its message to the gateway, a pinch point (or communication bottleneck) may exist in the mesh network. A wireless device may be deemed to be a pinch point if a failure of that device would result in other wireless devices in the network no longer having a route back to the gateway. A pinch point can have several negative impacts on a wireless network.

First, the wireless devices that have to communicate through the pinch point may have decreased communication reliability. Second, bandwidth for the wireless devices that have to communicate through the pinch point may be limited, and network performance may be adversely affected. Third, a wireless device that is a pinch point will consume additional power to transmit the increased message load. This is especially significant in battery-powered devices (resulting in decreased battery life) or devices dependent on energy scavenging (e.g. a solar-powered device).

Pinch points occur due to a variety of circumstances. For example, pinch points can be the result of poor network design or installation, of a constantly changing RF environment, changes in the physical space in which the network is located (which impacts the RF environment), and of wireless devices being taken out of service.

Information as to whether a wireless device is a pinch point is not provided by the wireless devices or by the gateway. In many cases, users of wireless mesh network are unaware that a pinch point exists in the network until one or more of the adverse affects mentioned above occur. At the time that the user detects the adverse affect, he or she may begin to examine and graphically build a diagram of communication links between wireless devices in order to identify pinch points. This process can take anywhere from minutes to hours, depending on the complexity of the wireless mesh network. Once the communication characteristics of the network are mapped and graphed, the user is then able to address the issues (or issues) causing a network pinch point.

A pinch point that has a low battery can be a critical situation. If a wireless device that is a pinch point runs out of power, its radio will cease to function. The wireless mesh network will lose the pinch point device, as well as those other wireless devices that depend on the pinch point to communicate with the gateway.

In other cases, the loss of a particular wireless device due to loss of power may cause another device within the network to become a pinch point. Although the device that becomes a pinch point may still have adequate battery power, negative impact on the performance of the wireless mesh network will still occur.

Wireless devices in wireless mesh networks typically report battery condition to the gateway along with the measured value of the process variable being sensed by the wireless device. If a low battery alert is recognized, a user of the wireless mesh network may prioritize the replacement of the battery based on the importance of the measurement (the process variable value) generated by that wireless device. This prioritization, however, does not take into account whether low battery condition of a particular wireless device causes that wireless device to create a pinch point failure, causes another wireless device within the network to become a pinch point, or both. Thus the user may be unaware that a device with a low battery may place the measurements of other wireless devices at risk.

SUMMARY

A wireless mesh network includes a device manager that evaluates radio statistics produced by the wireless devices of the network to determine whether the wireless mesh network has a pinch point. An alert is provided, so that a user can take action to remedy the pinch point before an adverse affect on reliability, bandwidth, or wireless device power occurs.

In another embodiment, the wireless mesh network includes a device manager that uses battery condition as well as radio statistics to evaluate and predict network performance. The device manager alerts the user to existence of a wireless device with a low battery that is a pinch point, or a wireless device with a low battery that may cause another device to become a pinch point.

DETAILED DESCRIPTION

Figure 1:
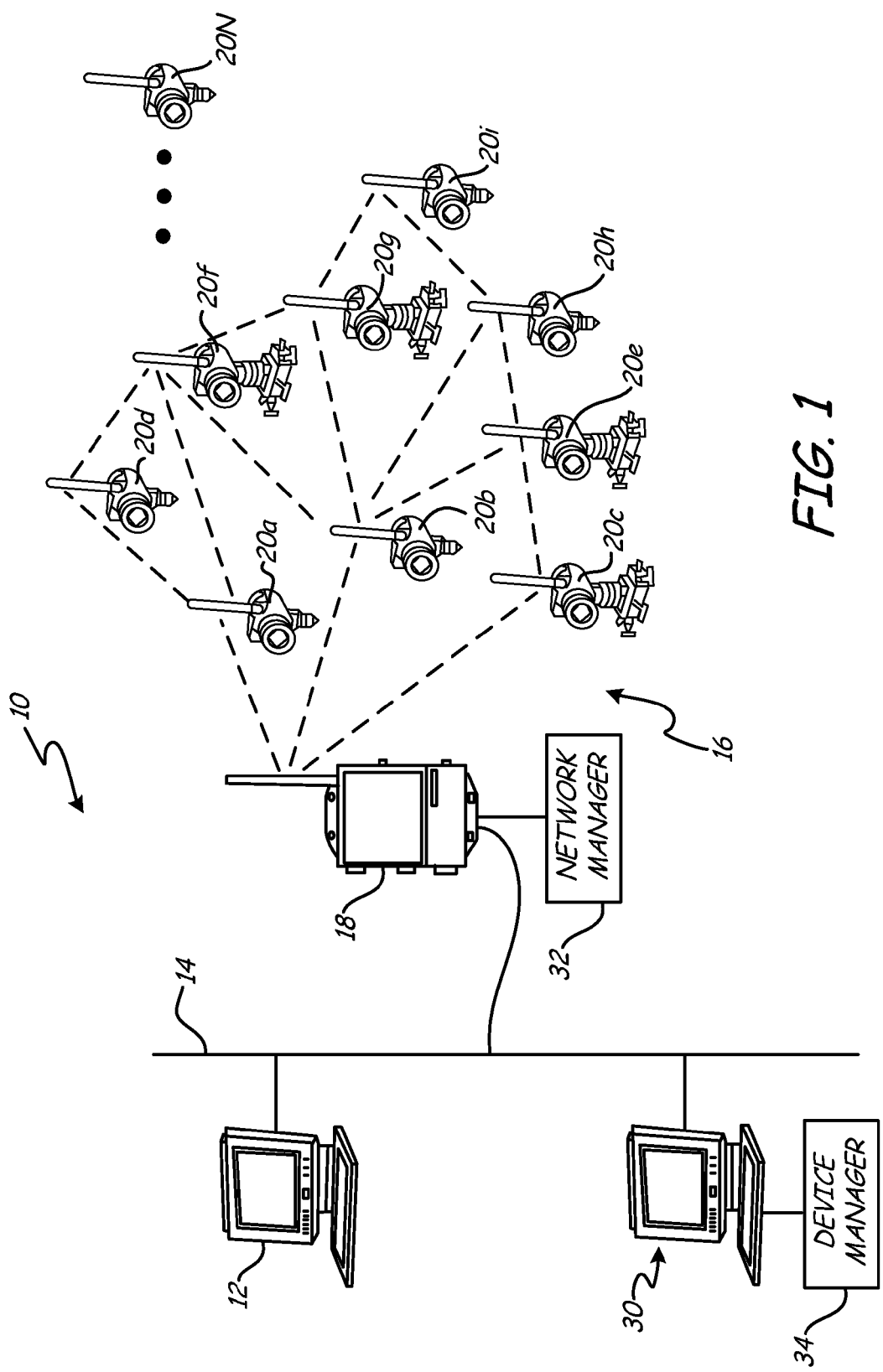
FIG. 1 is a diagram illustrating a self-organizing mesh network system in which messages are routed between a host and field devices.

FIG. 1 shows process communication system 10, which includes host computer 12, high-speed network 14, wireless mesh network 16 (which includes gateway 18 and wireless field devices or nodes 20a-20i . . . 20N), and network computer 30. Gateway 18 interfaces mesh network 16 with host computer 12 over high-speed network 14. Messages may be transmitted from host computer 12 to gateway 18 over network 14, and are then transmitted to a selected node of mesh network 16 over one of several different paths. Similarly, messages from individual nodes of mesh network 16 are routed through mesh network 16 from node-to-node over one of several paths until they arrive at gateway 18 and are then transmitted to host 12 over high-speed network 14.

Host computer 12 may be a distributed control system host running application programs to facilitate sending messages to field devices 20a-20N, and receiving and analyzing data contained in messages from field devices 20a-20N. Host computer 12 may use, for example, AMS (TM) Device Manager as an application program that allows users to monitor and interact with field devices 20a-20N. Host computer 12 may be located, for example, in a central control room and may display process information and alarms on a control room operator screen.

Gateway 18 can communicate with host computer 12 over network 14 using a number of different communication protocols. In one embodiment, network 14 is an RS485 two wire communication link, on which gateway 18 may communicate with host computer 12 using the MODBUS protocol. In another embodiment, network 14 is an Ethernet network, and communication over network 14 can support MODBUS TCP/IP using an Ethernet interface.

Gateway 18 and wireless devices 20a-20N communicate using a wireless communication protocol. In the following discussion, the WIRELESSHART protocol will be used by way of example, although other protocols usable in a wireless mesh network may also be used. The WIRELESSHART protocol uses time division multiple access (TDMA) and channel hopping to control communication within wireless network 16. Network manager 32, which may be implemented as software resident on gateway 18, schedules communications among wireless field devices 20a-20N and gateway 18. Network manager 32 also defines communication paths among the gateway and the various wireless devices 20a-20N.

Time division multiple access (TDMA) uses time slots. In which communication between the various devices can take place. The series of time slots are defined to form a TDMA super frame. Network manager 32 determines which devices are assigned to a particular slot within the super frame for communication. All of the devices within the network are time synchronized to form a communication. Network manager 32 also assigns the particular channel and frequency on which the assigned devices will communicate during a particular time slot.

Network manager 32 defines communication paths for messages traveling from gateway 18 to the various wireless devices 20a-20N, as well as communication paths of return messages from wireless devices 20a-20N to gateway 18. The paths of messages are assigned by network manager 32 using information received from each of the wireless devices 20a-20N. During commissioning of each wireless device or node, the node communicates with other nodes to determine its neighbors. A neighbor is defined as a device or gateway that is in active communication with the wireless device. During each communication, each wireless device measures received signal strength (RSSI) from and to a neighbor. It also generates a periodically reports path stability, RSSI and other radio statistics regarding wireless communication with its neighbors.

Network manager 32 makes use of the neighbor information and RSSI information in determining the communication paths to be used for outgoing and returned messages. For each message path, network manager 32 identifies the parent nodes and child nodes for the various hops or links of the path. A parent is a device that passes communications through itself for another device (its child). A child is a device that communicates through another device (a parent) to reach a third device or gateway. A neighbor may be a parent or a child. Although FIG. 1 shows wireless mesh network 16 with only a single gateway 18, in other embodiments more than one gateway may be included. In that case, the gateways share network manager 32 so that the same wireless protocol (in this case WIRELESSHART) is operating throughout wireless mesh network 16.

Network computer 30 may, for example, be a computer used by maintenance personnel to monitor and service wireless network 16. Network computer 30 may be located, for example, in an instrumentation and electrical (I&E) maintenance shop. Device manager 34 (which may be, for example, AMS (TM) Device Manager and AMS wireless SNAP-ON from Emerson Process Management) can be an application program running on network computer 30. Device manager 34 is used to provide alerts to maintenance personnel regarding existence of pinch points within wireless mesh network 16, as well as alerts regarding low battery conditions in wireless devices. Device manager 34 may also advise a user of the impact or likely impact of the pinch point, and may suggest how the pinch point may be resolved.

Each of wireless devices 20a-20N periodically reports radio statistics to gateway 18. These radio statistics are used by network manager 32 to determine communication paths and assign time slots. Radio statistics may also be used by device manager 34 in determining the existence of actual or potential pinch points. The radio statistics may include identification of neighbors, received signal strength (RSSI) from each neighbor, received signal strength (RSSI) to each neighbor, the percentage of successful communications with each neighbor (an indication of path stability), number of parents and children to that particular device or mode, parent-to-children ratio, parent-to-neighbor ratio, and children-to-neighbor ratio, and whether the device is within range of gateway 18. These radio statistics are gathered over a period of time and reported at intervals of, for example, about 15 minutes.

Each device also senses a parameter of the process (e.g. temperature, pressure, flow rate, liquid level) and sends a message containing the measured process variable to gateway 18 according to the schedule determined by network manager 32. Along with the process variable data, each wireless device 20a-20N also provides diagnostic data relating to the condition of operation of that device. The diagnostic information includes power source information. For those devices that are battery powered, the diagnostic information includes an indication of battery condition. Diagnostic information is received by gateway 18 and is provided over network 14 to network computer 30 and device manager 34.

Device manager 34 uses the radio statistics received by gateway 18 from wireless devices 20a-20N to analyze wireless network 16 for pinch points. There are a number of different ways that device manager 34 may use information, either individually or in combination, to identify pinch points. For example, information regarding the number of wireless devices within range of gateway 18 can be used as an indication of a pinch point condition. If less than three devices are in range of gateway 18, or if less than a certain percentage of all of the devices in network 16 (e.g. less than 10 percent) are within range of gateway 18, one or more pinch points may exist.

Another way of identifying pinch points is using the number of neighbors. If a particular device has an unusually large number of neighbors, this may indicate that it is a pinch point. In another method described in conjunction with FIG. 2, individual analysis of each device with respect to its neighbors can be used to identify which devices are pinch points.

Another method of identifying a pinch point from radio statistics uses the parent-to-children ratio of each node. A pinch point may be identified if the device has an unusually large or unusually small parent-to-children ratio. The statistical deviation of the parent-to-children ratio from mean values within the network can also be used by device manager 34 as an indication of a pinch point. Similar analysis can be performed using other ratios such as parent-to-neighbor or child-to-neighbor ratios.

The statistical deviation of the number of neighbors at a particular device with respect to the mean number of neighbors for each device within network 16 can indicate that the device in question is a pinch point.

When device manager 34 identifies a pinch point within wireless mesh network 16, it provides an alert to maintenance personnel through network computer 30. The alert indicates that a pinch point exists, and can identify by device number or by a visual representation the particular device that is a pinch point. In providing the alerts, device manager 34 can provide visual displays in which individual devices 20a-20N are represented in conjunction with a visual representation of the space in which they are located. An example of such a display is described in co-pending application Ser. No. 12/394,399 filed Feb. 27, 2009, and entitled "System for Visualizing Design and Organization of Wireless Mesh Networks and Physical Space", which is assigned to the same assignee as the present application, and is incorporated by reference in its entirety.

When diagnostic information from one of wireless devices 20a-20N indicates a low battery condition, device manager 34 can prioritize the low battery alert that is provided based upon whether the device reporting the low battery condition is either a possible pinch point itself, or would cause a possible pinch point to occur upon its failure. Device manager 34 can use the existing radio statistics to determine whether the device reporting a low battery condition is currently a possible pinch point. It can also perform an analysis to identify possible pinch points in the event that the device reporting the low battery condition were no longer present within wireless mesh network 16.

By performing a pinch point analysis for wireless mesh network 16 in conjunction with a reported low battery condition, device manager 34 can provide a prioritized low battery alert to the user. Normally a low battery condition will first be reported some time prior to the anticipated power failure. By providing an indication of the priority of battery condition as it relates to pinch points, the user is provided an indication of the criticality of an early replacement of the battery power source for the wireless device reporting a low battery condition. In that way, maintenance can be scheduled so that the highest priority battery replacement occurs first.

Figure 2:
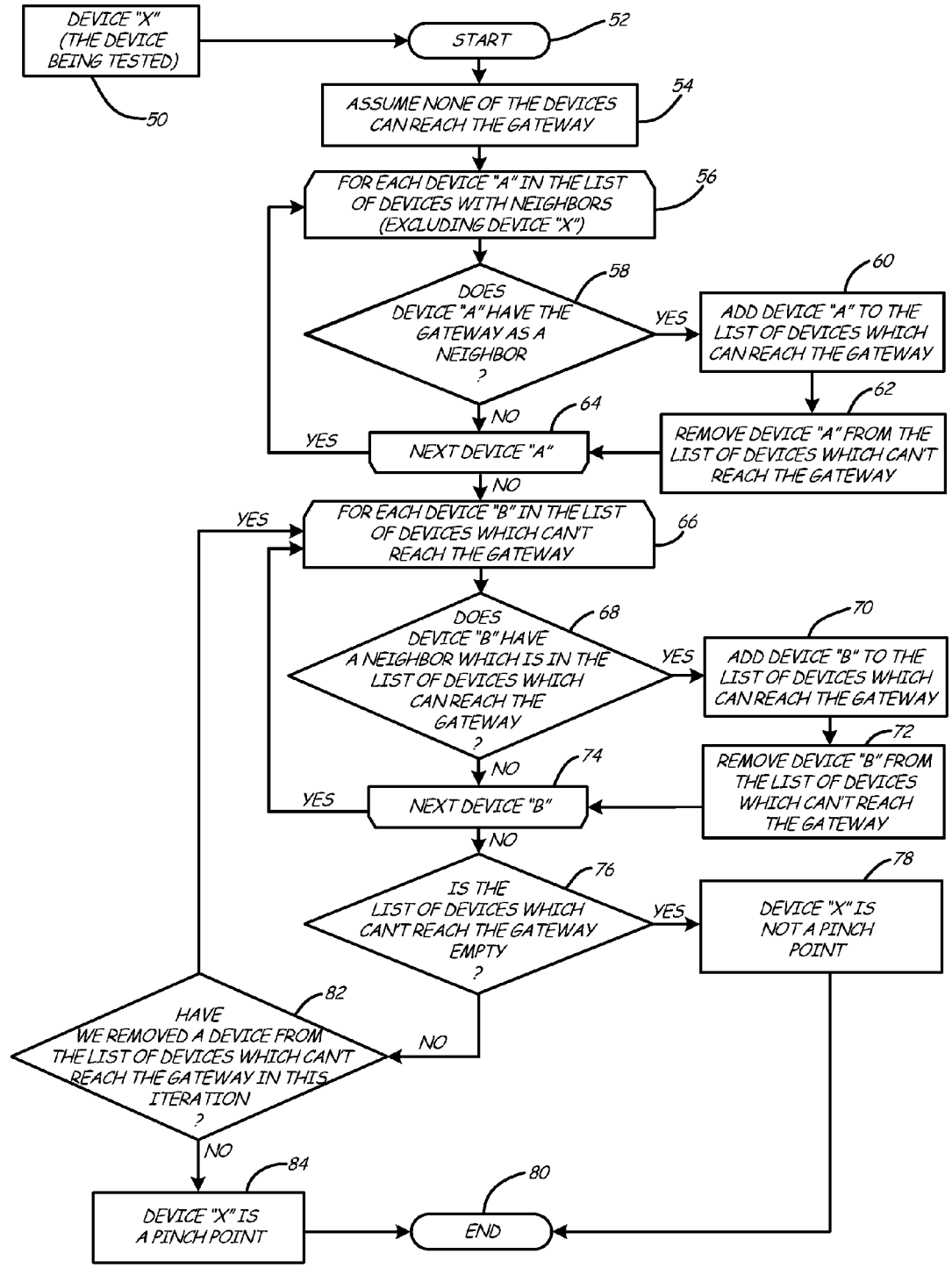
FIG. 2 is a flow chart illustrating one method of determining pinch points using neighbor information.

As described previously, there are a number of different ways in which pinch points can be identified. The particular method or combination of methods used to analyze radio statistics from the wireless devices can vary. FIG. 2 illustrates one method, which uses neighbor information provided by the wireless devices to identify pinch points. This method allows pinch points to be identified without requiring parent/child information to the device.

The method first eliminates all devices identified which have no neighbors. These may be, for example, devices that were active within network 16 at one time, but have been withdrawn or replaced, or which are no longer operating. Testing of the remaining devices is the performed as illustrated by FIG. 2.

FIG. 2 is a flow chart showing the evaluation of each wireless device X being tested to determine whether it is a pinch point. Upon having a device X identified for testing (step 50), device manager 34 starts the test procedure (step 52). Initially, device manager 34 assumes that none of the wireless devices can reach gateway 16 (step 54). Device manager 34 then accesses the list of devices with neighbors (excluding device X). For each device A in the list of devices with neighbors (step 56), device manager 34 determines whether device A has gateway as a neighbor (step 58).

If the answer is yes, device manager 34 adds device A to the list of devices which can reach the gateway (step 60). Device manager 34 also removes device A from the list of devices which cannot reach the gateway (step 62). Device manager 34 then proceeds to the next device A within the list (step 64). Alternatively, if device A at step 58 does not have the gateway as a neighbor, device manager 34 proceeds to the next device A (step 64).

Device manager 34 then proceeds to testing of each device B in the list of devices which cannot reach the gateway (step 66). Device manager 34 determines whether device B has a neighbor which is in the list of devices which can reach the gateway (step 68). If device B does have a neighbor in the list of devices which can reach the gateway, device B is added to the list of devices which can reach the gateway (step 70), and device B is removed from the list of devices which cannot reach the gateway (step 72).

Device manager 34 then proceeds from step 72 to testing of the next device B (step 74). If the answer to the inquiry at step 68 is no (i.e. device B does not have a neighbor in the list of devices which can reach the gateway), then device manager proceeds to the next device B (step 74).

If there is another device B to test, device manager 34 returns to step 66 and repeats the steps. This continues until the last device B has been tested. At that point, device manager 34 determines whether the list of devices which cannot reach the gateway is empty (step 76). If the answer is yes, device X is identified as not being a pinch point (step 78), and the testing ends (step 80).

On the other hand, if the list of devices which cannot reach the gateway is not empty, device manager 34 determines whether a device was removed from the list of devices that cannot reach the gateway in the latest iteration (step 82). If the answer is yes, device manager 34 returns to step 66. If the answer is no, device X is identified as a pinch point (step 84). At that point, the process ends (step 80). The process illustrated in FIG. 2 is repeated for each device X that is identified as having neighbors within mesh network 16. When all devices have been tested using the method of FIG. 2, device manager 34 has a complete list of devices that are identified as pinch points.

The method illustrated by FIG. 2 has the advantage of using only neighbor information to make pinch point identification. This method may be used by itself, or in conjunction with any of the other methods described.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method comprising:
    collecting radio statistics received from all wireless devices of a wireless mesh network;
    determining communication paths, parent-child relationships and communication time slots for the wireless devices based upon the radio statistics;
    identifying a pinch point within the wireless mesh network based upon the radio statistics, the pinch point being a wireless device of the wireless mesh network whose failure would result in at least one other wireless device of the wireless mesh network no longer having a communication path to a gateway;
    producing an alert that indicates existence of the pinch point; and
    wherein the radio statistics include at least one of received signal strength from neighbors, percentage of successful communications with neighbors, number of parents to each wireless device, number of children to each wireless device, a parent-to-children ratio, a parent-to-neighbor ratio, and a children-to-neighbor ratio.

2. The method of claim 1 and further comprising:
    receiving battery condition data from the wireless devices; and
    producing a prioritized low battery alert if a wireless device with a low battery is the identified pinch point.

3. The method of claim 1 and further comprising:
    receiving battery condition data from the wireless devices; and
    producing a prioritized low battery alert if failure of a wireless device with a low battery will cause the wireless device to become a pinch point.

4. The method of claim 1, wherein identifying the pinch point includes performing a pinch point analysis based upon a number of wireless devices within radio range of a gateway.

5. The method of claim 1, wherein identifying the pinch point includes performing a pinch point analysis based upon neighbors of each wireless device.

6. The method of claim 1, wherein identifying the pinch point includes performing a pinch point analysis based upon at least one of a parent-to-children ratio, a parent-to-neighbor ratio, and a children-to-neighbor ratio.

7. The method of claim 1 and further comprising:
    providing a visual display that includes a visual representation of a particular wireless device that is the pinch point.

8. A method comprising:
    collecting radio statistics from all wireless devices of a wireless mesh network;
    determining communication paths, parent-child relationships, and communication time slots for the wireless devices based upon the radio statistics;
    receiving battery condition data from the wireless devices;
    producing a prioritized low battery alert based upon the battery condition data and the radio statistics, the prioritized low battery alert produced if a wireless device with a low battery condition is a pinch point, or failure of the wireless device will cause another wireless device in the wireless mesh network to become a pinch point, the pinch point being a wireless device of the wireless mesh network whose failure would result in at least one other wireless device of the wireless mesh network no longer having a communication path to a gateway; and
    wherein the radio statistics include at least one of received signal strength from neighbors, percentage of successful communications with neighbors, number of parents to each wireless device, number of children to each wireless device, a parent-to-children ratio, a parent-to-neighbor ratio, and a children-to-neighbor ratio.

9. The method of claim 8, wherein the radio statistics include at least one of identification of neighbors, received signal strength from neighbors, percentage of successful communications with neighbors, number of parents to each wireless device, number of children to each wireless device, a parent-to-children ratio, a parent-to-neighbor ratio, and a children-to-neighbor ratio.

10. A method comprising:
    collecting radio statistics received from all wireless devices of a wireless mesh network;
    determining communication paths, parent-child relationships and communication time slots for the wireless devices based upon the radio statistics;
    identifying a pinch point within the wireless mesh network based upon the radio statistics, the pinch point being a wireless device of the wireless mesh network whose failure would result in at least one other wireless device of the wireless mesh network no longer having a communication path to a gateway;
    producing an alert that indicates existence of the pinch point; and
    wherein the radio statistics include identification of neighbors, received signal strength from neighbors, percentage of successful communications with neighbors, number of parents to each wireless device, number of children to each wireless device, a parent-to-children ratio, a parent-to-neighbor ratio, and a children-to-neighbor ratio.

11. The method of claim 10 and further comprising:
    receiving battery condition data from the wireless devices; and producing a prioritized low battery alert if a wireless device with a low battery is the identified pinch point.

12. The method of claim 10 and further comprising:
receiving battery condition data from the wireless devices; and
producing a prioritized low battery alert if failure of a wireless device with a low battery will cause the wireless device to become a pinch point.

13. The method of claim 10, wherein identifying the pinch point includes performing a pinch point analysis based upon a number of wireless devices within radio range of a gateway.

14. The method of claim 10, wherein identifying the pinch point includes performing a pinch point analysis based upon neighbors of each wireless device.

15. The method of claim 10, wherein identifying the pinch point includes performing a pinch point analysis based upon at least one of a parent-to-children ratio, a parent-to-neighbor ratio, and a children-to-neighbor ratio.

16. The method of claim 10 and further comprising:
providing a visual display that includes a visual representation of a particular wireless device that is the pinch point.

\* \* \* \* \*